Aug. 16, 1938.    A. WEISS    2,126,849
BRAKE FOR MOTOR VEHICLES
Filed Sept. 1, 1936
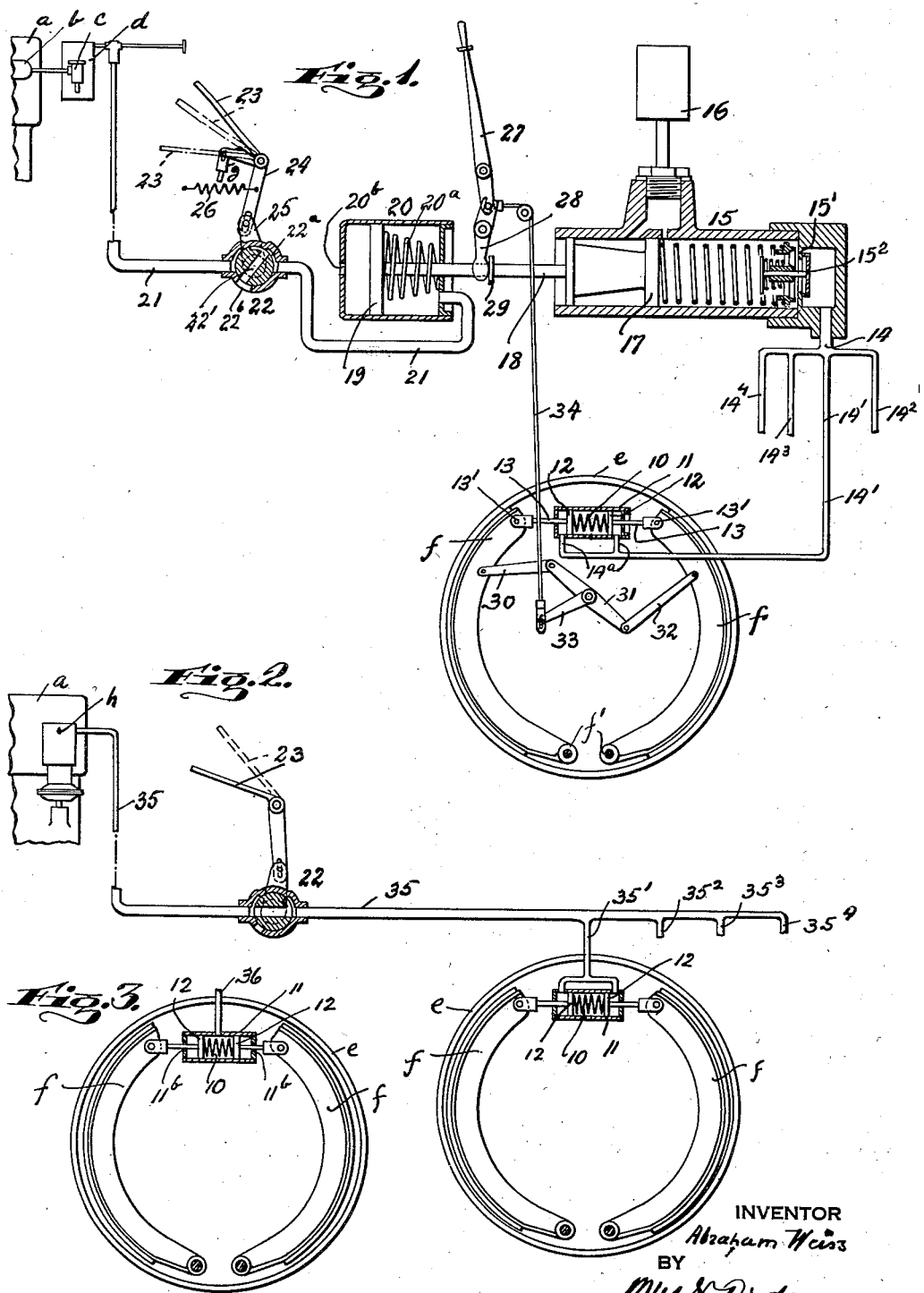
INVENTOR
Abraham Weiss
BY
ATTORNEY Patented Aug. 16, 1938

2,126,849

UNITED STATES PATENT OFFICE 2,126,849

BRAKE FOR MOTOR VEHICLES

Abraham Weiss, New York, N. Y.

Application September 1, 1936, Serial No. 98,854

4 Claims. (Cl. 188—170)

This invention relates to motor vehicles and particularly to means for operating the brakes thereof.

The main object of this invention is to provide a brake system in which the mode of operation of the brakes is the reverse of the one hitherto used, that is to say, in which instead of the brakes being applied through the actuation of a brake pedal or the like, the brakes normally, i. e., when the vehicle is at a standstill, will be automatically held in braking position but released through the actuation of a pedal or any other element operated by the driver preparatory to starting the motor or vehicle. This reverse mode of operation of the braking mechanism is advantageous in that it insures greater safety in driving and affords simplification of the braking mechanism both as to construction and operation thereof.

Another object of this invention is to further simplify the braking mechanism and reduce the cost of manufacture of a motor vehicle and facilitate the operation thereof by eliminating the brake pedal as a separate element and utilizing the accelerator pedal both for successively releasing the brakes and feeding the fuel preparatory to the starting of the vehicle. Such construction will enable the driver to manipulate the vehicle without the necessity of shifting his foot from the position above the accelerator pedal to another hitherto occupied by the brake pedal. Instead, the driver will place one foot in front of the accelerator pedal and on pressing with the other foot on the clutch pedal, will depress the accelerator pedal, which through mechanisms to be further explained will have the effect of first releasing the brakes and on further depression feed the fuel in the usual manner.

In addition to the simplification of construction and operation of the brakes and vehicle in general, there is the advantage that rolling back of the vehicle which frequently occurs during the shifting of the foot from the brake pedal to the accelerator pedal and which is very annoying and often occasions accidents will be entirely prevented.

With these and other objects in view, my invention consists in the novel combination, construction and arrangement of parts as will be hereinafter more fully described and defined in the appended claims.

My invention may be used in connection with any brake system such as hydraulic, vacuum, compressed air, or any other power controlled brakes, requiring but slight constructional changes which in themselves do not form part of this invention.

In the accompanying drawing which constitutes part of this specification and in which similar reference characters denote corresponding parts Fig. 1 is a sectional diagrammatic view of a brake with hydraulic control embodying my invention, Fig. 2 is a similar view of a compressed air controlled brake system, and Fig. 3 a similar partial view of a vacuum controlled brake system embodying my invention.

Referring first to the first modification, $a$ denotes the motor of a motor vehicle, $b$ the intake manifold thereof, $c$ the vacuum control valve associated with a vacuum tank $d$ connected to the intake manifold, $e$ denotes the usual brake drum of a vehicle wheel and $f$ the usual swinging brake shoes cooperating with said brake drum and each fulcrumed at one end as at $f'$ to the brake casing (not shown).

According to my invention, the brake shoes $f$ are adapted normally, i. e., when the vehicle is at a standstill, to be automatically applied and maintained in braking position by suitable means such as an expansion spring 10, and to be released by the application of hydraulic power when starting the vehicle.

In the present example the spring 10 is arranged in the hydraulic fluid cylinder 11, which, per se, is of well known construction used with hydraulic brakes, and in which are movably mounted pistons or plungers 12 whose rods 13 are operatively connected as at 13' to the toes of the brake shoes. The spring 10 being mounted between the pistons 12 will tend to press the latter outwardly so as to force the brake shoes $f$ into braking action. Terminating into the ends of the fluid cylinder 11 of each wheel are branches 14$^a$ of a tube 14' branching off a main tube 14 leading from the master fuel pump or cylinder 15, which also may be of the construction usual with hydraulic brakes and which as usual comprises a check valve composed of an inlet valve 15' and an outlet valve 15$^2$ of well known construction. Other tubes 14$^2$, 14$^3$, 14$^4$ lead to the fluid cylinders of the other wheels. 16 denotes the hydraulic fluid supply tank provided on and communicating with the master cylinder 15. Working in said master pump or cylinder 15 is a spring actuated piston 17 operatively connected by a connecting rod 18 with the piston 19 of a power unit 20 of well known construction so that both pistons will move in unison. Leading from the vacuum tank d into the rear of the power unit 20 is a pipe 21 which is provided with a suitable valve 22 for controlling the admission of vacuum from said vacuum tank d into the power unit 20. This valve is adapted to be operated through the manipulation of a pedal 23. 20<sup>b</sup> denotes an air vent in said cylinder 20.

In the present example the valve 22 is shown in form of a two way cock. When the vehicle is at a standstill the piston 19 of the power unit and also the piston 17 of the hydraulic fluid pump 15 are to be retracted so that there is no fluid in front of the pistons 12 in the fluid cylinder 11 and the spring 10 holds the brake shoes in braking position. To this end the valve body 22<sup>a</sup> with its passage 22' is so positioned that communication between the vacuum tank d and the power unit 20 is cut off, but atmospheric pressure is admitted through passage 22' and air passages 22<sup>a</sup>, 22<sup>b</sup> to the cylinder of the power unit at the rear of piston 19. As pedal for operating the valve 22 I am utilizing the accelerator pedal 23 which is so arranged in relation to the fuel feed mechanism indicated by g and the valve 22 that during its first part of depression it will not affect said fuel feed mechanism but merely move the valve to cause the release of the brakes and from that point on act as accelerator.

Thus, when the vehicle is at rest this accelerator pedal 23 occupies the uppermost position indicated by full lines. The same is so operatively connected to the valve 22 through levers 24 and 25 or the like, that when the accelerator pedal is in uppermost position the valve 22 is so positioned that atmospheric pressure will be admitted to the cylinder 20 of the power unit through the passages 22<sup>a</sup>, 22<sup>b</sup> and 22' and pipe section 21, thereby in conjunction with spring 20<sup>a</sup> of said power unit holding the piston 19 in its forward position. Consequently, piston 17 will be retracted and there will be no fluid in the fluid cylinder, so that the brakes will be forced in braking position by spring 10. When starting the motor the pedal 23 is depressed from said full line position into the first dotted line position. This will position the valve 22 so that its passage 22' will open communication through pipe 21 between the vacuum tank d and the rear of the power cylinder 20, and at the same time the admission of air into the rear of said cylinder will be cut off. As a result thereof, the piston 19 of the power cylinder under the atmospheric pressure admitted through vent 20<sup>b</sup> will be retracted causing the piston 17 of the master cylinder 15 to force hydraulic fluid into the fluid chamber 12 through the outlet value 15² so as to compress the spring 10 and thereby release the brake shoes f. During the entire period of the depression of the accelerator pedal from the first to the second dotted line or lowermost position said pedal will act on the fuel feed mechanism g in the usual manner. When the vehicle is to be stopped and the accelerator pedal is released, the later from the instant it reaches the upper dotted line position and moves to the full line position will move the valve 22 so as to cut off vacuum from the power unit 20. As a result thereof the piston 19 will move forwardly pulling along with it the piston 17, which will suck back the fluid from the cylinder 11 into cylinder 15 through the inlet valve 15'. In consequence thereof the brakes will be applied by the spring 10. Thus, one and the same pedal will serve both as brake control and accelerator pedal.

Auxiliary means may be provided to manually release the brakes in case of a leak in the fluid feeding system, or stalling of the motor and lack of vacuum supply.

In the present example I have shown such means to consist of an emergency lever 27, similar to that used with emergency brakes, and a push lever 28 adapted to coperate with a shoulder 29 provided on the piston rod 18. Thus, when the motor is stalled or there is lack of vacuum in the tank d the hand lever 27 can be manipulated to advance the piston 17 and thereby inject the hydraulic fluid from the master cylinder 15 into the fluid cylinder 11 to cause the release of the brakes.

Operatively connected to said hand lever 27 may be another safety mechanism for manually releasing the brakes in case of leakage of hydraulic fluid. This mechanism comprises a set of levers 30, 31, 32 and crank arm 33 associated with the brake shoes f and a cable 34 or the like, connected to the hand lever 27. By manipulating the lever 27, the cable 34 will turn the arm 33 thereby causing the levers 30, 32 to retract the shoes f from the braking position.

In the modification according to Fig. 2, compressed air is employed for the release of the brakes. Here h denotes a suitable compressed air tank connected to the motor a of the vehicle in well known manner and from which a feed pipe 35 leads into the ends of the fluid feed branches 35', 35², 35³ and 35⁴ terminating into the brake cylinders 11 of the vehicle wheels. Here also the spring 10 is a compression spring acting on the pistons 12 in each cylinder to hold the brake shoes in operative position. The compressed air feed through pipe 35 is controlled by the valve 22 operated from the accelerator pedal 23 as in the first modification.

When the accelerator pedal is in its initial or uppermost position (shown by dotted lines) the valve closes communication between the compressor tank h and the fluid cylinder 11. When the accelerator pedal is depressed to the full line position, in which it begins to operate the fuel feed mechanism, it admits compressed air into the cylinder 11, which compresses the spring 10 and releases the brakes.

In the modification shown in Fig. 3 the brake release is controlled by vacuum. The only difference in construction from that shown in Fig. 2 is that the vacuum feed pipe 36, instead of terminating into the end of the fluid cylinder 11 at the rear of the pistons 12, terminates in the center, i. e., into the space between said pistons 12, so that the atmospheric pressure at the rear of the pistons entering through vents 11<sup>b</sup> will compress the spring 10 and release the brakes.

Since various modifications may be made in the construction of the means embodying my invention without departing from the principle thereof, I do not wish to restrict myself to the details described and shown.

What I claim is:

1. In a motor vehicle having brake mechanism, spring influenced means adapted to automatically apply the brakes, hydraulic means for releasing said brakes, including a fluid master cylinder and piston therein, a power unit, comprising a cylinder and piston therein operatively connected to said first named piston, a valve for controlling the pressure in said power unit and a manually actuated means for operating said valve.

2. In a motor vehicle having a vacuum creating source and brake mechanism, means for applying the brakes including a cylinder and a pressure exerting means operatively connected to said brakes, hydraulic means for releasing the pressure of said brakes including a master fluid pump communicating with said cylinder and a vacuum controlled power unit including a piston operatively connected to said master pump, a valve for controlling the vacuum in said power unit and a manually controlled means for operating said valve.

3. In a motor vehicle having brake mechanism, means adapted to automatically apply the brakes, means for releasing said brakes including pressure exerting means, a power unit actuating said pressure exerting means, means for controlling the pressure in said power unit and a manually actuated means for operating said control means.

4. In a motor vehicle having brake mechanism, means adapted to automatically apply the brakes, means for releasing said brakes including pressure exerting means, a fluid operated power unit actuating said pressure exerting means, means for controlling the admission of fluid in said power unit and a manually actuated means for operating said control means.

ABRAHAM WEISS.